Nov. 16, 1954  H. RUMPF ET AL  2,694,492
METHOD OF AND APPARATUS FOR CLASSIFYING
MATERIALS IN LIQUID AND GASEOUS MEDIA
Filed Aug. 16, 1950  6 Sheets-Sheet 1

INVENTORS
Hans Rumpf
Fritz Kaiser
by
Pennie, Edmonds, Morton and Barrows
ATTORNEYS

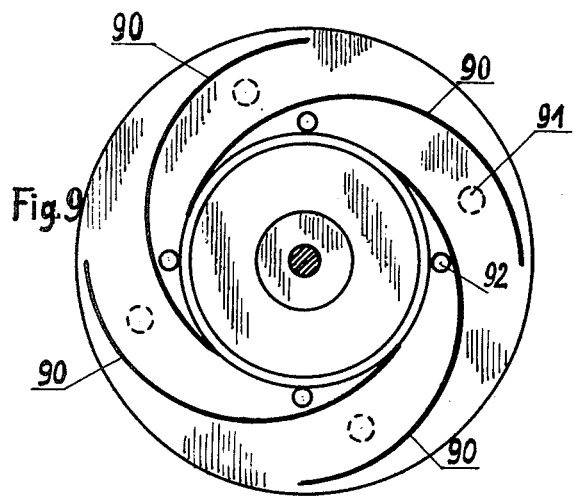
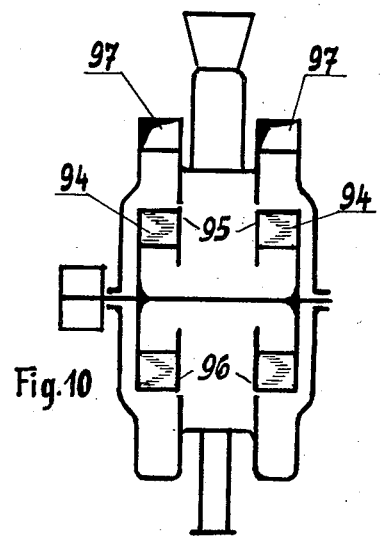
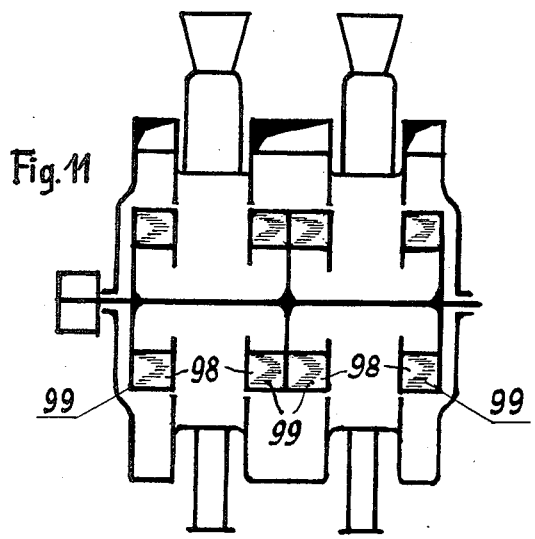
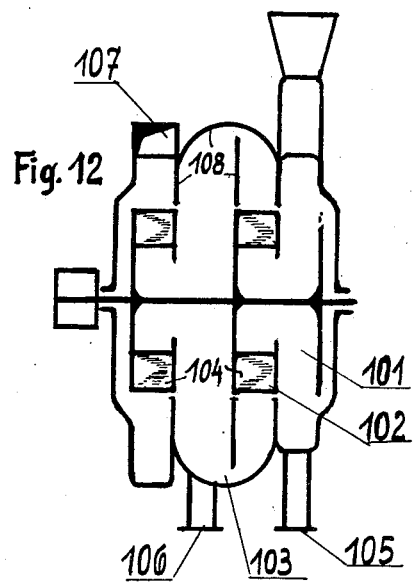

INVENTORS
Hans Rumpf
Fritz Kaiser
Pennie, Edmonds, Morton and Barrows
ATTORNEYS.

Nov. 16, 1954   H. RUMPF ET AL   2,694,492
METHOD OF AND APPARATUS FOR CLASSIFYING
MATERIALS IN LIQUID AND GASEOUS MEDIA
Filed Aug. 16, 1950   6 Sheets-Sheet 5
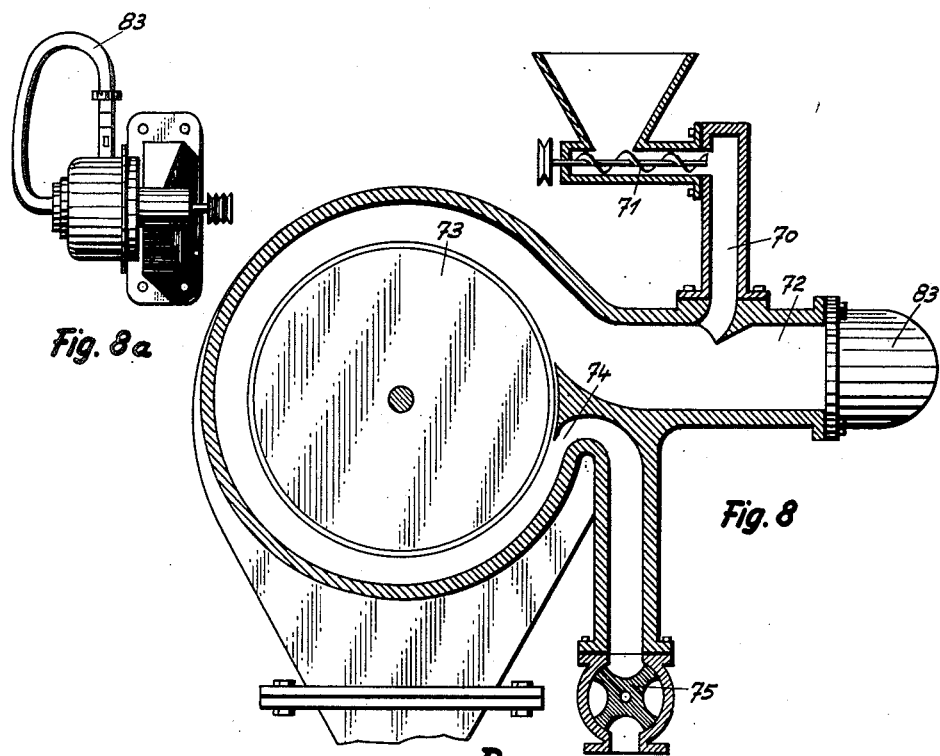
Fig. 8a
Fig. 8
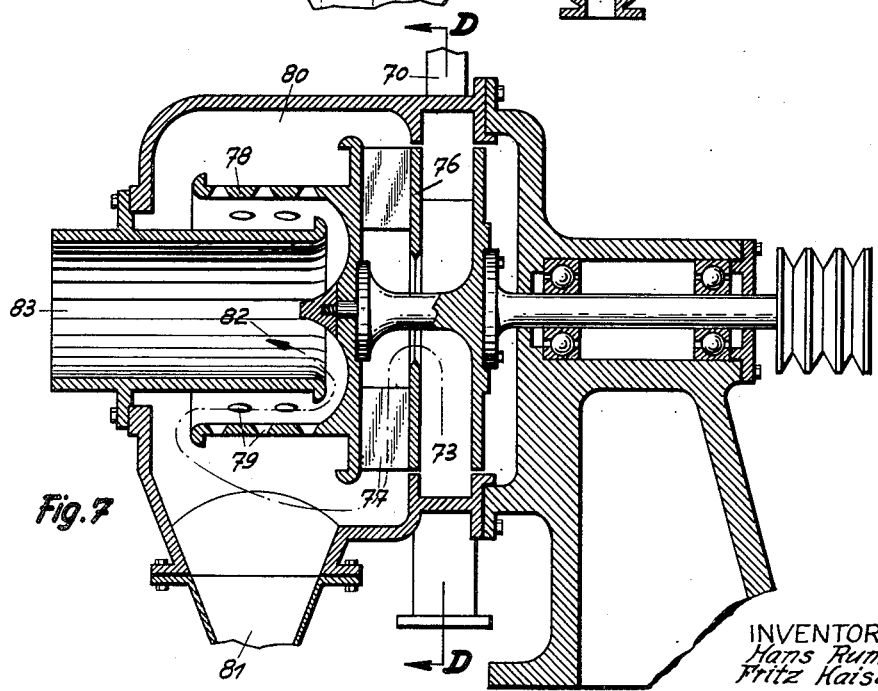
Fig. 7
INVENTORS
Hans Rumpf
Fritz Kaiser
ATTORNEYS.

INVENTORS
Hans Rumpf
Fritz Kaiser
by
Pennie, Edmonds, Morton and Barrows
ATTORNEYS United States Patent Office 2,694,492
Patented Nov. 16, 1954

2,694,492

METHOD OF AND APPARATUS FOR CLASSIFYING MATERIALS IN LIQUID AND GASEOUS MEDIA

Hans Rumpf and Fritz Kaiser, Augsburg, Germany

Application August 16, 1950, Serial No. 179,696

Claims priority, application Germany October 1, 1948

4 Claims. (Cl. 209—144)

This invention relates to methods and apparatus for sifting liquid and gaseous media.

Many sifters have been developed in the past in which the material to be sifted is separated into two fractions, i. e. a fraction of coarse particles and a fraction of fine particles, or also into two or more fractions of different specific weights, said separation into fractions taking place under the influence of forces being effective in different directions and acting upon the material suspended in the medium of flow. The forces participating in the sifting operation generally comprise on the one hand the frictional force acting on the material particles and on the other forces depending upon a mass, such as gravity, centrifugal force, and impact force.

Sifters in which an inwardly spiralling flow is produced, both such types having vanes and those with free sifting chamber have long been known. In vane-type sifters the sifting flow is disturbed even with the most favorable design of the vanes, as is known from turbine investigation.

Other types of sifters have the disadvantage that jets of high velocity considerably disturb the flow.

Sifters have been proposed further, in which such disturbances as described above are eliminated and which, therefore, give considerably improved sifting performance. Heretofore, however, it has not been possible to eliminate another important source of trouble produced by the boundary layer at the front walls of the sifting chamber. This boundary layer has no or only a very small rotational component owing to its high wall friction, whilst due to the pressure drop being effective from without inwards a comparatively great radial component is created carrying inward also such coarse particles which would be thrown off outwardly in an unaffected spiralling flow. The degree of fineness of the sifting process is accordingly depending upon what happens in the boundary layer or, in other words, the sifting process proper substantially takes place in the boundary layer, whilst the main flow only serves to drive the boundary layer without affecting the sifting process as such. This results in a low weight rate of flow and high energy consumption.

There is one particular type of sifters, the so-called circulating-air wind sifters, in which the material of a rotating impeller wheel is thrown into a screw-like rising flow, the coarse particles being discharged towards below by the combined action of gravity and centrifugal force, whilst the fine particles are carried upwardly by the flow. In consequence of the repeated deflection of the flow at sharp edges and the introduction of the material transversely to the direction of flow there will be a superposition of numerous vortices therein causing a considerable intersection of the fractions.

In another type of sifters the material-laden sifting air is tangentially blown into a cone-shaped chamber, the coarse particles being discharged outward by centrifugal action, whilst the fine particles are axially withdrawn by the air. Thus different flow lines are produced so that the conditions of separation are not clear and a considerable intersection of the fractions will be unavoidable too.

In a still further type of sifters the carrier air laden with material to be sifted is passed from without inwards through a rotating impeller wheel, the coarse particles being discharged by centrifugal action and impact, whilst the fine particles remain in the air stream and are discharged inward. The passage of the carrier air through the impeller wheel which is responsible for a vivid formation of vortices in the flow originates a remarkable disturbance of the conditions of equilibrium.

Attempts have been made further to realize an undisturbed flow in which the conditions of separation are congruent for all of the flow lines with a view to obtain a sharp separation of the two fractions. This is, for instance, possible when utilizing the centrifugal force as a sifting force in an undisturbed screw-like flow with the coarse particles being discharged transversely to the direction of flow, or in an inwardly spiralling flow in which a state of equilibrium is prevailing for a predetermined grain size between the outwardly directed centrifugal force and the inwardly directed fractional force. It has been found that the theoretically expected separation does not take place in such sifters.

It is one primary object of the invention to eliminate simultaneously all of the disturbances of the sifting flow capable of causing a deterioration of the sifting process. Such disturbances are produced (a) by vanes which affect the rotational symmetry of the flow. Elimination by omitting the vanes (free sifting chamber); (b) by single jets of high velocity which both disturb the rotational symmetry and the congruence of the flow pattern in the single layers of flow. Elimination by introducing the sifting air uniformly distributed over the entire periphery and the total height of the sifting chamber, said sifting chamber extending, for instance in the case of introducing the air through a volute, not as far as to the wall thereof but only to an imaginary cylinder centrally inscribed into the free space within this volute; (c) by the boundary layer, i. e., by the layer of flow adjacent the walls. Even in the event of the layers of flow remote from the walls presenting completely rotationally symmetric and congruent flow patterns owing to the steps taken under (a) and (b) there will be still considerable disturbances caused by the boundary layers.

A further object of the invention is to provide a sharp and undisturbed separation in conformity with the theoretical recognitions by systematically influencing the boundary layers. It has been found, as already stated, that the considerable deviations from the separating effect theoretically expected, occurring with the type of sifters referred to above in the last instant, is caused by the flow characteristics in the boundary layer.

According to the invention various ways are proposed to eliminate the disturbing influence of the boundary layer.

Further objects of the invention are accordingly to influence the boundary layer as to its velocity and/or direction and to eliminate it as such.

The disturbing influence of the boundary layer is conditioned, for instance, in the case of an inwardly spiralling flow between two stationary walls, by the fact that, owing to the drop in pressure being effective from without inwards, the inwardly flowing boundary layer follows an essentially steeper spiral path than the sifting flow proper. Accordingly there will be a substantially coarser grain carried inwardly at the boundary layer than in the sifting flow. As the boundary layer flow is entrained inward by the leaving sifting flow, the fine material produced in the sifting flow is interspersed by the remarkably coarser particles remaining in the boundary layer. Thus the flow in the boundary layer is determinative for the degree of fineness that can be obtained in the sifting process. It is therefore a still further object of the invention to prevent in such type of sifter the boundary layer flow from being united with the leaving sifting flow. This can be realized by removing the boundary layer with the help of suction means provided in the walls, discharging the material-laden withdrawn boundary layer flow either separately or admixing it again into the flow entering the sifter.

A further object of the invention resides in blowing the boundary layer into the sifting flow in order to subject the material particles to the normal sifting conditions prevailing therein.

A further object of the invention consists in reversing the direction of motion of the boundary layer so that it is moved from within outwards instead of from without inwards. This can be effected by imparting to the walls a rotational speed so rated that the desired reversion of the boundary layer flow will take place over the entire area concerned. The rotation of the walls effects a reversion of the pressure gradient in close proximity thereof thereby simultaneously causing a reversion of the boundary layer flow.

Since it is an object of the invention to provide a sifting process in which the boundary layer is influenced such as to avoid disturbance of said process, it will accordingly take place over the entire cross section of the undisturbed flow. This will bring about for a certain required degree of sifting fineness a quite considerable increase of the weight rate of flow and a simultaneous reduction of the energy required so that in many fields of application fine sifting will be possible only following one or a combination of the procedures substantially as proposed by the invention.

Finally it is a principal object of the invention to provide a sifting device for sifting in a planar inwardly spiralling flow of a carrier medium characterized by the simultaneous application of steps for obtaining a flow of the carrier medium which is congruent and rotationally symmetric in all of the planes of flow remote of walls and a flow in the boundary layers adjacent walls such that by no means coarser grain will be carried inwardly than by said first mentioned flow.

Other objects and advantages of the invention will appear more fully hereinafter from a consideration of the detailed description which follows, taken together with the accompanying drawings wherein several embodiments of the invention are illustrated. It is to be expressly understood, however, that the drawings are for the purpose of illustration and description only and are not designed as a definition of the limits of the invention, reference being had for this purpose to the appended claims.

In the drawings:

Fig. 7 is a vertical sectional view of a sifter with rotating front walls, introduction of air and material through a volute, discharge of material in tangential direction through a cell type sluice, and application of a fan wheel and of a cyclone to one of the front walls of the fan wheel, and circulating air;

Fig. 8 is a sectional view on the line D—D of Fig. 7;

Fig. 8a is a diagrammatic plan view of the sifter according to Figs. 7 and 8;

Fig. 9 is a diagrammatic view showing the arrangement of four volutes according to Fig. 4;

Fig. 10 is a diagrammatic view showing the arrangement of one fan wheel each at each front wall;

Fig. 11 is a diagrammatic view showing two sifters arranged in parallel on the same shaft;

Fig. 12 is a diagrammatic view showing two sifters arranged in series on the same shaft;

Figure 1:
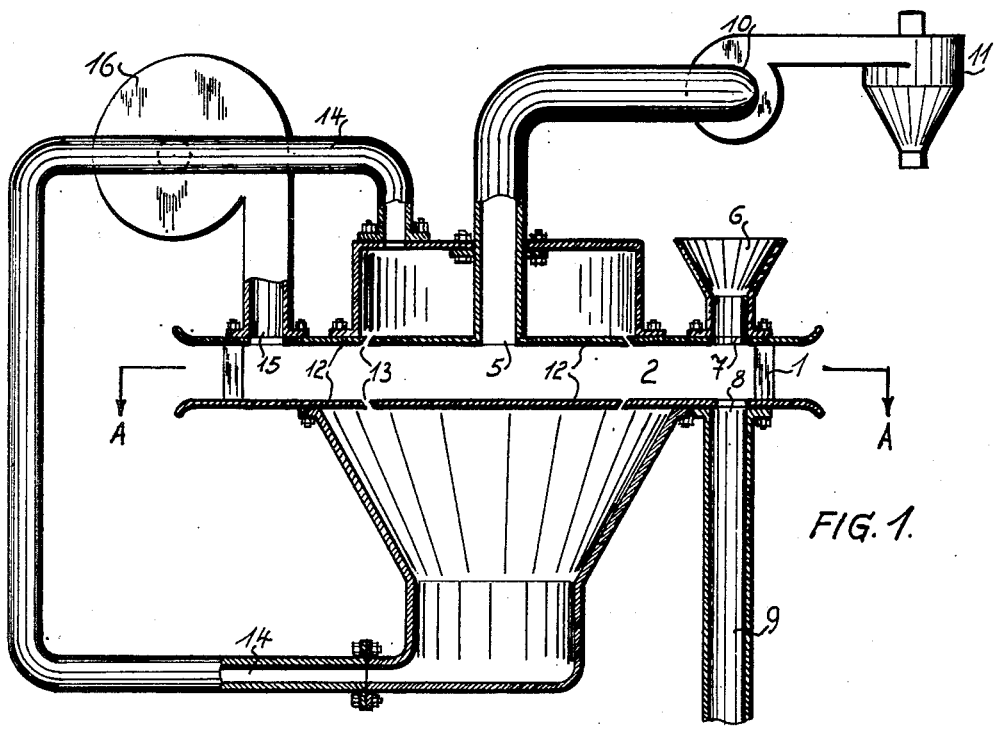
Fig. 1 is a vertical sectional view of a sifter with removal by suction of the boundary layer, air supply by a vane ring, introduction of material through an opening in the upper front wall and discharge of coarse particles through an opening in the lower front wall.
Figure 2:
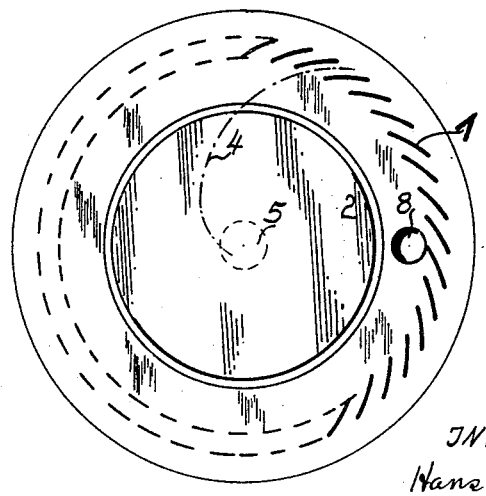
Fig. 2 is a horizontal sectional view of the sifting chamber on the line A—A of Fig. 1.

Referring now to Figs. 1 and 2, the sifting air enters the sifting chamber 2 through the vane ring 1 following a spiral path 4 and leaves it through a central outlet 5. The material to be sifted is fed to the sifting chamber through the hopper 6 and the passage 7. The coarse particles are thrown off outward by centrifugal action and finally leave the sifting chamber through the opening 8 for being gravitationally discharged through a shaft 9 into a bin (not shown). The fine particles are entrained inwardly by friction in the flow and removed by suction through the opening 5 by means of the fan 10 and forced into the separator 11. Part of the coarse material travels in the slowly flowing boundary layer along the front walls 12 which without the steps provided according to the invention would contaminate the fine material. In order to avoid this, the boundary layer is removed together with the coarse particles entrained therein from the sifting chamber by suction through the slots 13. The air drawn off together with the coarse particles contained therein is then fed through a conduit 14 to a fan which forces it through the opening 15 again into the sifting chamber 2.

Figure 3:
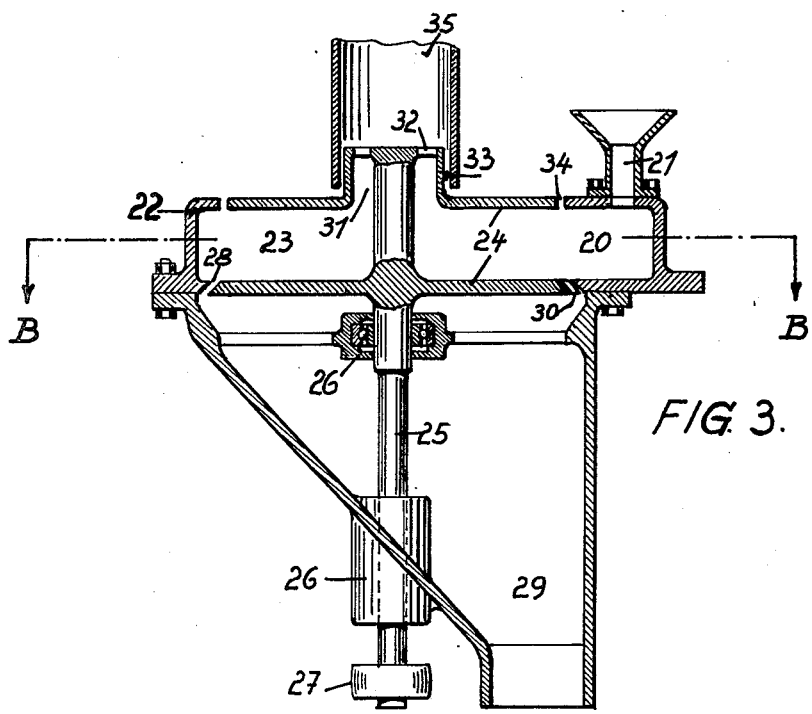
Fig. 3 is a vertical sectional view of a sifter with rotating front walls, introduction of material and air through a volute and discharge of coarse particles through an annular slot.
Figure 4:
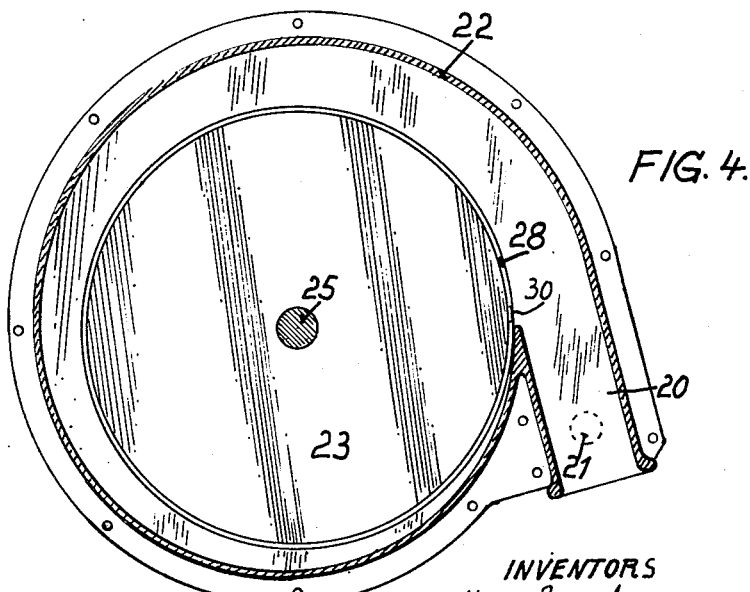
Fig. 4 is a horizontal sectional view on the line B—B of Fig. 3.

In Figs. 3 and 4 the sifting air is drawn in through the conduit 20 into which the material to be sifted is gravitationally fed through the opening 21. The mixture of air and material to be sifted is fed through the volute 22 into the sifting chamber 23, the front walls 24 of which are rotating at a speed so rated that the boundary layer is thrown off outward which prevents material from being carried inwardly. The flow within the sifting chamber effecting the sifting process remains completely undisturbed with this arrangement and accordingly enables sharp sifting with a high weight rate of flow. The shaft 25 to which the rotating front walls 24 are secured is mounted in bearings 26 and driven by a pulley 27 from any suitable source of power. The coarse particles fall through the annular slot 28 into the bin 29. In the case of adhesive material, the annular slot 28 may be kept clear by a scraper 30 or the like. The fine material laden air is removed by suction through the central opening 31, the spokes 32 and the tube 35, e. g. by means of an arrangement as shown in Fig. 1. Some air is drawn in through the gaps 33 and 34 which, however, does not further impair the process.

A circumferential speed of the rotating walls, two or three times the velocity of the entering air was found to be particularly efficient, but also other rates of speed may be used with advantage.

Figures 5, 6:
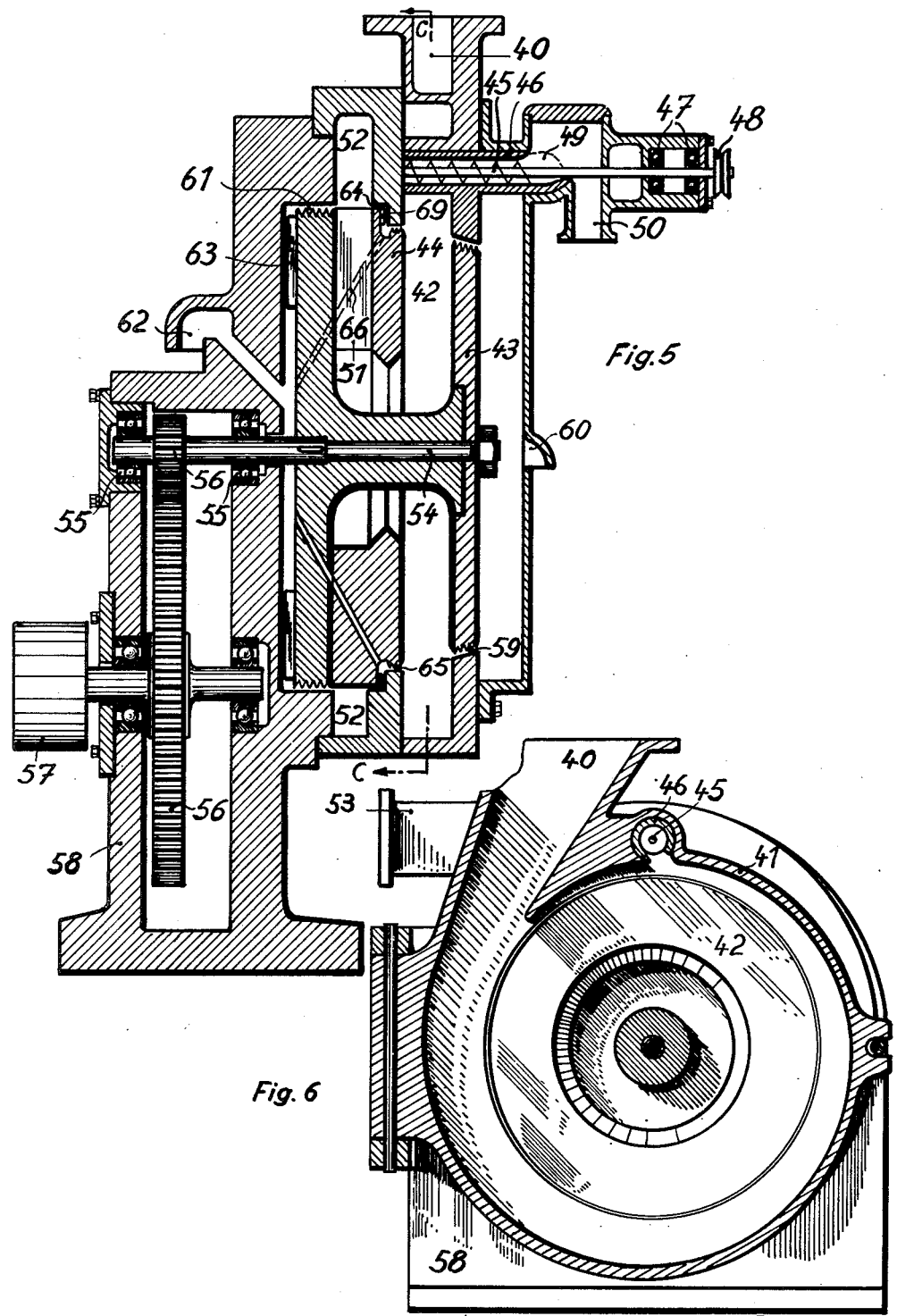
Fig. 5 is a sectional view of a sifter with rotating front walls, introduction of air and material through a volute, discharge of coarse particles in tangential direction by means of a feed screw and application of a fan wheel to one of the rotating walls.
Fig. 6 is a sectional view on the line C—C of Fig. 5.

In Figs. 5 and 6 the sifting air mixed with the material to be sifted is drawn in through the conduit 40 and fed through the volute 41 into the sifting chamber 42 with rotating front walls 43 and 44, the functions of which have already been explained in the foregoing. The coarse particles are discharged in this case by the feed screw 45 rotating in the casing 46 and rotationally mounted in the bearings 47 with driving connection through a V-belt pulley 48 with a suitable source of power. After being discharged by the worm 45 the material forms a heap 49 serving as a seal against the negative pressure in the sifting chamber 42 and falls through a gravity shaft 50 into a bin (not shown). At the rear of the rotating front wall 44 fan blades 51 are milled into the wall material effecting an air motion through the entire sifting plant thus rendering redundant externally arranged fans. The air laden with fine particles then leaves the sifter through the discharge volute 52 and the flanged pipe socket 53 for being blown into a separator (not shown). The sifter shaft 54 is mounted in ball bearings 55 and driven through a pair of gear wheels 56 and a V-belt pulley 57 from a suitable source of power. The gearbox 58 simultaneously serves in this case to support thereon the apparatus as a whole.

In the case of wearing or adhesive material it is important to keep the movable gaps free from material by scavenging with pure air. The gap 59 is held clear by the air flowing in through the opening 60.

The scavenging air for the gap 61 enters through the opening 62 and is brought to the required positive pressure by the back vanes 63. The gaps 64 and 65 are supplied with air through the conduit 66 inside the fan vanes 51. The intermediate vanes 69 compensate for the difference in pressure between the spaces 42 and 52. To provide an improved sealing effect and in order to avoid seizing when grazing against each other, the movable gaps are designed as a labyrinth.

In Figs. 7, 8 and 8a in which a volute is provided, the air laden with the material to be sifted passes through the gravity shaft 70 and the screw feeder 71 and enters through the conduit 72 the sifting chamber 73 wherein the sifting operation takes place as described in connection with Figs. 5 and 6. The coarse particles, after having been tangentialy discharged through the opening 74, leave through the cell type sluice 75. The rotating wall 76 carries, like in Fig. 5, a fan 77 but in addition thereto a cyclone 78 separating the fine particles from the air and allowing their entry through openings 79 into the annular space 80 from where they fall by gravity into the bin 81. The arrow 82 indicates the meridian component of the path of the air.

The air which is now in a high degree dustfree is again fed to the entrance duct 72 through the bypass conduit 83. This sifter is accordingly operating with circulating air which is advantageous in many cases.

Fig. 9 is a diagrammatic view of the same arrangement as shown in Fig. 4, however, with four introducing volutes 90 instead of one and with a corresponding number of entrance ports 91 and discharge openings 92. This arrangement sometimes offers the advantage of higher weight rates of flow.

Fig. 10 diagrammatically illustrates the arrangement of two fan wheels 94 on rotating front walls 95 of a sifter which, owing to the enlarged sifting chamber 96, gives higher weight rates of flow, the arrangement of all other parts of the sifter being intended as in Fig. 8. The air laden with fine particles is discharged through the conduits 97.

Fig. 11 shows in the same way as Fig. 10 two sifting chambers 98 arranged in parallel on one shaft and the corresponding fan wheels 99. This arrangement gives still higher weight rates of flow.

Fig. 12 shows in a similar way two sifters arranged in series on the same shaft. In this arrangement the fine particles discharged from the sifter 101 by the fan 102 are fed by the baffle 103 into the second sifting chamber 104 where they are subjected to a second sifting process with the same or a smaller boundary of separation. This arrangement gives a particularly sharp sifting or a separation into three fractions: coarse material 105, medium sized material 106, and fine material 107. The walls 108 of the baffle 103 may be so designed as to rotate together with the sifting chambers.

Figure 13:
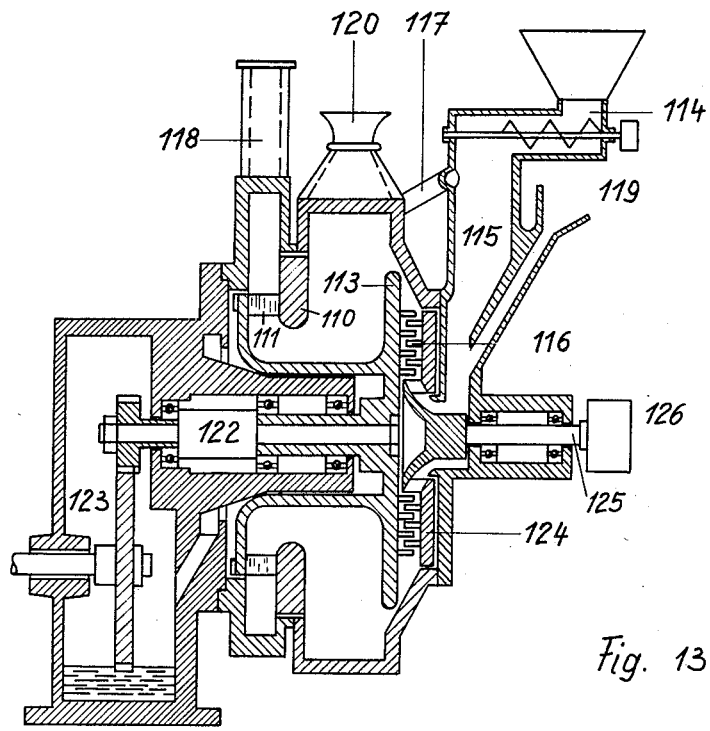
Fig. 13 is a sectional view of a sifter, of which one of the rotating front walls is carrying a fan wheel, the other rotating wall being equipped with a pin carrying grinding disk attached thereto and return feed of the coarse material to the raw feed.
Figure 14:
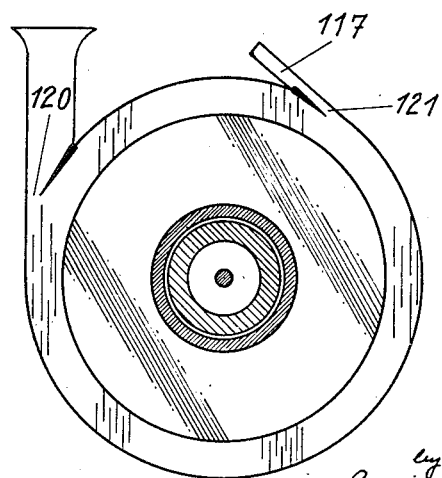
Fig. 14 is a diagrammatic sectional view of the sifting chamber of Fig. 13.

Figs. 13 and 14 show a sifter the rotating wall 110 of which carries a fan 111 whilst to the other wall a pin carrying grinding disk is secured.

This grinding disk crushes the material, fed thereto by the screw feeder 114 and the gravity shaft 115, between the pins 116 and introduces it in a finely distributed condition smoothly into the sifting air flow where the sifting process takes place as described in the foregoing. The coarse particles thrown off are then fed back through the conduit 117 to the grinding disk. The fine particles are blown through the pipe socket 118 into the separator. Additional air may be supplied to the grinding disks through the opening 119 e. g. by a reduction in temperature. For the adjustment of the grain size, the opening 120 for the introduction of the sifting air and the outlet 121 for the coarse particles can be made adjustable. The sifter shaft 122 is driven by the gearing 123. The counter grinding disk 124 rotates with the shaft 125 and may be driven by means of a pulley 126 in the same or in the opposite sense of rotation as the grinding disk 113 in order to improve the grinding effect.

The following results have been obtained in an apparatus according to the invention. The sifter type 132 MP has a sifting chamber diameter of 132 mm. and a rotational speed of 12,000 R. P. M. It works down a quantity of air of 200 kg./h. at an entrance velocity of 35 m./sec. thus sifting 250 kg./h. of chalk to 10 microns. The power required was 0.6 H. P. exclusive gearing.

Though in the foregoing mention has been made only of air as a sifting medium, it will be understood that, of course, any other gaseous or liquid carrying medium may be employed, provided the particles to be sifted are heavier than the carrying medium which can also be selected and conditioned so as to permit simultaneous drying, cooling or chemical treatment of the material.

The walls of the sifting chamber are shown in the drawings as having plane surfaces though it may be advantageous in some cases to have concave or convex walls.

What is claimed is:

1. Apparatus for the continuous classification of a mixture of fine and coarse material in a planar inwardly spiralling flow of a fluid carrier medium in a chamber, comprising a substantially cylindrical separating chamber free of any obstruction or device influencing the spiraling flow therein, said chamber being defined by two spaced apart substantially plane end members which are rotatable about a common axis and a stationary outer member, one of the rotary plane end members being provided near or at its rotational axis with an opening for the discharge of fine material, means arranged outside the separating chamber for producing a flow of carrier medium through the said chamber from the periphery towards the said opening, guiding means at the periphery of said separating chamber connected to said stationary outer member for peripherally introducing the fluid carrier medium and thereby producing said planar inwardly spiralling flow of said carrier medium, means for continuously feeding the material to be classified into said spiralling flow of carrier medium in the separating chamber, and means for continuously discharging the coarse material from an area outside the circumference of the said rotary plane end members, the fine material being discharged from the separating chamber together with the flow of carrier medium through the said opening.

2. Apparatus for classifying a mixture of fine and coarse material, comprising two spaced parallel planar walls capable of being rotated about a perpendicular axis and defining a flat substantially cylindrical separating chamber free of any obstruction or device influencing the spiraling flow therein, a stationary volute arranged in peripheral relationship to said chamber for introducing the material suspended in a fluid carrier medium, one of said rotatable walls being provided with a centrally disposed opening for removing the fine material suspended in the carrier medium, one of the rotating walls and the stationary volute defining between them an annularly arranged outlet means for discharging the separated coarse material, and means for applying a suction to said opening for the removal of fine material.

3. Apparatus for classifying a mixture of fine and coarse material in a fluid carrier medium, comprising two spaced substantially parallel planar walls rotatable about a horizontal axis and defining a free separating chamber formed between said walls, a stationary volute substantially surrounding said chamber, a perpendicular feed duct at said stationary volute, said volute and feed duct being so arranged that the entering material-laden carrier fluid will have a direction such that it is peripherally introduced into the separating chamber, the arrangement being further such that at the periphery of said volute a short distance anterior to the entrance of said feed duct the coarse material will be tangentially peeled and discharged in an axial direction, feeding means for effecting said discharge towards a heap of material and into the external atmosphere, and hollow fan blades secured to the back of one of the rotating walls of the separating chamber and a volute for removing the fine material-laden carrier fluid by suction and discharging it from the chamber, the said rotating walls and said stationary volute forming narrow annular gaps between them, said annular gaps being adapted to be kept clean by fresh air supplied by said fan blades.

4. Apparatus for the continuous classification of a mixture of fine and coarse material in a planar inwardly spiralling flow of a fluid carrier medium in a chamber, comprising a substantially cylindrical separating chamber, free of any obstruction or device influencing the spiralling flow therein, said chamber being defined by two spaced apart substantially plane end members which are rotatable about a common axis and a stationary outer member, one of the rotary plane end members being provided near or at its rotational axis with an opening for the discharge of fine material, means arranged outside the separating chamber for producing a flow of carrier medium through the said chamber from the periphery towards the said opening, means for introduction at the periphery of said chamber a fluid carrier medium with a certain rotational component into said separating chamber and thereby producing said planar inwardly spiralling flow of carrier medium, means for continuously feeding the material to be classified into said spiralling flow of carrier medium in said separating chamber, and means for continuously discharging the coarse material from an area outside the circumference of the said rotary plane end members, the fine material being discharged from the separating chamber together with the flow of carrier medium through the said opening.

(References on following page)

References Cited in the file of this patent

UNITED STATES PATENTS

| Number | Name | Date |
|---|---|---|
| 2,032,827 | Andrews | Mar. 3, 1936 |
| 2,361,758 | De Flique | Oct. 31, 1944 |
| 2,546,068 | Gustavsson | Mar. 20, 1951 |

FOREIGN PATENTS

| Number | Country | Date |
|---|---|---|
| 506,488 | Great Britain | May 30, 1939 |
| 544,397 | Great Britain | Apr. 10, 1942 |